United States Patent Office 3,772,267
Patented Nov. 13, 1973

3,772,267
2-CYANO-4-NITRO - 6 - METHYLSULFONYL-1-[4'-DIETHYLAMINO - 2'-ACETYLAMINO-PHENYL-AZO]-BENZENE
Dieter Cornelius, Darmstadt-Arheilgen, Hanswilli von Brachel, Leopoldshohe, and Heinz Bender, Bergen-Enkheim, Germany, assignors to Cassella Farbwerke Mainkur Aktiengesellschaft, Frankfurt am Main, Germany
No Drawing. Continuation-in-part of application Ser. No. 791,775, Jan. 16, 1969. This application Nov. 8, 1971, Ser. No. 196,737
Claims priority, application Germany, Jan. 19, 1968, P 17 19 066.8
Int. Cl. C07c *107/06*; C09b *29/08*
U.S. Cl. 260—207.1                               1 Claim

ABSTRACT OF THE DISCLOSURE

A water-insoluble monoazo dyestuff of the formula:

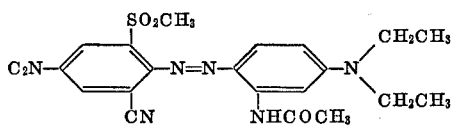

said dyestuffs being particularly suited for dyeing and printing synthetic fibers.

CROSS-REFERENCE TO RELATED APPLICATION

This application is a continuation-in-part of application Ser. No. 791,775 filed Jan. 16, 1969 and now abandoned.

The present invention relates to water-insoluble monoazo dyestuff of the formula:

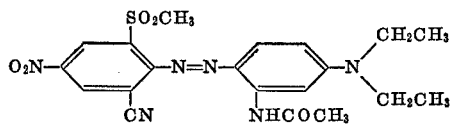

The dyestuff of the present invention may be obtained by methods well known to those skilled in the art. Thus, diazotization of an amine of the formula:

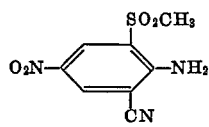

and subsequent coupling with a coupling with a coupling component, free from water-solubilizing groups, of the formula:

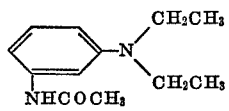

yields the desired dyestuff. It may also be obtained by the procedure described in U.S. Pat. application Ser. No. 640,839 filed May 24, 1967, and now abandoned. In accordance with that procedure, a dyestuff, which has a halogen substituent in the position where the final dyestuff contains a cyano substituent is reacted with cuprous cyanide or a mixture of a cuprous compound and an alkali metal or an alkaline earth metal cyanide in a reaction inert organic solvent in order to replace the halogen substituent with a cyano substituent.

The dye of the present invention is particularly suited for the dyeing and printing of particles made from hydrophobic synthetic materials, such as those made from cellulose acetate or cellulose triacetate, and especially polyester materials based on polyethylene glycol terephthalate. When applied to these materials, it yields, according to the usual dyeing and printing process, deep dyeings and full prints of a rare blue shade having very good fastness properties. In particular, it has excellent fastness to light, sublimation and bleaching. It is unique to discover a dyestuff yielding the rare blue shade in question and also having excellent fastness to sublimation.

Printing of the above-mentioned materials can be carried out in such a manner that the materials printed with the dye of the present invention are steamed in the presence of a carrier at temperatures from about 95 to 110° C. or, in the absence of a carrier, at approx. 120 to 140° C. or are treated according to the so-called thermofixing process. Dyeing of said materials with the dye of the present invention is advantageously performed from an aqueous suspension in the presence of carriers at temperatures of between 80 and 110° C. or, in the absence of carriers, at temperatures ranging from about 110 to 140° C. or according to the so-called thermofixing process.

The following examples illustrate the preparation of the dyestuff of the pesent invention. All temperatures are in degrees centigrade and all parts and percentages are by weight.

Example 1

24.1 g. 2-cyano-4-nitro-6-methylsulfonyl-aniline is added at 15–20° with stirring to 107 g. nitrosyl-sulphuric acid (prepared from 7 g. sodium nitrite and 110 g. sulphuric acid). At approximately 10°, the solution is admixed with 100 g. glacial acetic acid and at about 0°, 100 g. ice is added. Subsequently, this reaction mixture is stirred for ½ hour. The diazo solution thus obtained is allowed to run into a solution of 20.6 g. N,N-diethyl-N'-acetyl-m-phenylenediamine dissolved in 200 cc. of 10% sulphuric acid to which 100 g. ice has been added. The reaction mixture is diluted with water and the dyestuff thus precipitated is filtered off with suction and washed with water until neutral. The dyestuff which is obtained dyes, in finely dispersed form, polyester fibres to a rare blue shade having excellent fastness properties, particularly fastness to light, to sublimation and bleaching.

Example 2

The dyestuff of Example 1 is also obtained if 51.2 g. 2 - bromo - 4 - nitro - 6 - methylsulfonyl-1-[4'-diethyl-amino-2'-acetylamino-phenylazo]-benzene dissolved in 100 g. dimethylformamide is heated with 9 g. copper(I) cyanide and 1 g. sodium cyanide for 15 minutes at 100°. Upon cooling, the desired dyestuff crystallizes out.

What is claimed is:
1. The water-insoluble monoazo dyestuff of the formula

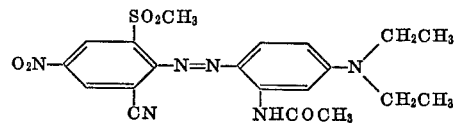

References Cited

FOREIGN PATENTS 1,511,932    9/1967    France _____ 260—207.1

LEWIS GOTTS, Primary Examiner

C. F. WARREN, Assistant Examiner

U.S. Cl. X.R.

8—41 C, 50; 260—465 E